(12) United States Patent
Valerdi Rodriguez et al.

(10) Patent No.: US 8,515,492 B2
(45) Date of Patent: Aug. 20, 2013

(54) ENERGY MANAGED SERVICE PROVIDED BY A BASE STATION

(75) Inventors: David Valerdi Rodriguez, Madrid (ES); Miguel Arranz Arauzo, Madrid (ES)

(73) Assignee: Vodafone Group, PLC, Newbury, Berkshire (GB)

( * ) Notice: Subject to any disclaimer, the term of this patent is extended or adjusted under 35 U.S.C. 154(b) by 292 days.

(21) Appl. No.: 12/828,673

(22) Filed: Jul. 1, 2010

(65) Prior Publication Data

US 2011/0021248 A1   Jan. 27, 2011

(30) Foreign Application Priority Data

Jul. 1, 2009   (ES) .................................. 200930397

(51) Int. Cl.
*H04M 1/00* (2006.01)
(52) U.S. Cl.
USPC ............ 455/561; 455/572; 455/573; 455/574
(58) Field of Classification Search
None
See application file for complete search history.

(56) References Cited

U.S. PATENT DOCUMENTS

| 6,584,330 | B1* | 6/2003 | Ruuska | 455/574 |
|---|---|---|---|---|
| 2007/0191076 | A1 | 8/2007 | Hageman et al. | |
| 2009/0239569 | A1* | 9/2009 | Dottling et al. | 455/522 |
| 2010/0198420 | A1* | 8/2010 | Rettger et al. | 700/291 |

FOREIGN PATENT DOCUMENTS

| EP | 1 610 571 | 12/2005 |
|---|---|---|
| GB | 2 281 458 | 3/1995 |

\* cited by examiner

*Primary Examiner* — German Viana Di Prisco
(74) *Attorney, Agent, or Firm* — B. Aaron Schulman, Esq.; Nicholas B. Trenkle, Esq.; Stites & Harbison, PLLC

(57) ABSTRACT

A method and a system are described for adapting a service provided by a base station in a cellular communication network to mobile stations in its coverage area. The base station is supplied with energy from a renewable energy generator and/or from a back-up battery supply. The back-up battery supply is at least partially charged by the renewable energy generator. The service is adapted in terms of coverage and/or capacity provided to the mobile stations as a function of the stored energy in the back-up battery supply and/or as a function of a forecast regarding the amount of energy supplied by the renewable energy generator over a time period.

8 Claims, 2 Drawing Sheets

ENERGY MANAGED SERVICE PROVIDED BY A BASE STATION

BACKGROUND OF THE INVENTION

1. Technical Field

The present invention relates to a method for adapting a service provided by a base station in a cellular communication network as well as to a corresponding system.

2. Description of Related Art

Energy consumption and $CO_2$ emissions have recently become topics of particular interest across the cellular telecommunication industry. Around 80% of the energy consumption and $CO_2$ emissions from cellular network operators are originated within their networks and more specifically within the base stations thereof (wherein a base station in case of second generation GSM cellular networks is referred to as Base Transceiver Station/BTS and in case of third generation UMTS cellular networks is referred to as Node B). The overall contribution of cellular network operators to the excess of human $CO_2$ emissions is estimated at 2%, see "Smart 2020: enabling the low carbon economy in the information age" GeSI, Global e-Sustainability Initiative. Hence reducing and optimising energy consumption of this particular element of the network is a strategic target for the cellular communication industry, not only because it makes business sense (around 10% of the network's operating expenses is budgeted for energy consumption in mature markets, this figure is significantly higher in emerging markets), but also companies are more and more engaged in Corporate Social Responsibility programs with particular focus on sustainability and environmental actions. The topic acquires particular relevance in emerging markets, with a poor or no electricity grid, and with a significant amount of base stations using diesel generators, which are particularly greedy in terms of operational expenditure, $CO_2$ emissions & logistic requirements. Those off grid or poor grid diesel powered base stations are widespread in countries like India or on the African continent, which is a strong barrier for further deployment of cellular communication services in those countries.

The combination of above factors is moving the cellular communication industry to the introduction of renewable sources of energy, such as solar energy, wind energy and bio-energy for the energy supply to their networks. These solutions are environmentally friendly and technically proven, but when it comes to real implementation there are several drawbacks that limit their applicability:

The number and size of elements (solar panels, wind turbines) required to provide standard service is often large, sometimes beyond workable and practical installation levels.

Sun and wind are intrinsically instable sources of energy, forcing operators to deploy significant sets of back-up batteries able to supply the necessary energy during periods of shortage of sun, wind, etc.

Regarding the dimensioning of renewable equipment, the following criteria are usual practice across the industry:

The renewable energy generator typically consists of solar panels or wind turbines. Sun or wind are inherently unstable energy sources that shall be able to provide, when working at maximum performance enough energy to feed the average power consumption needs of the BTS/Node B and also charge the batteries to face the next sun/wind outage. As a rule of thumb, the criterion used for dimensioning solar panels or other renewable energy generators is that a completely empty set of batteries shall be fully refilled during a period of ten days without outage of the renewable energy source, i.e. ten sunny days, ten windy days, etc. For determining the amount of solar panels to be installed or the turbine size to be used, not only the required generated energy should be taken into account but also the environmental conditions where the BTS/Node B is located.

During night time (in case of using solar panels as energy generator) or other outages (rainy periods, no wind periods, or in case that a hybrid energy supply is used with a diesel generator, no spare diesel), a battery back-up supply consisting of a set of batteries is utilized to provide energy to the base station during a back up period. A typical rule of thumb for base stations, which are only supplied with renewable energy sources, is that the batteries shall be able to carry the energy corresponding to the typical consumption of the base station over three days. So, the base station works normally in case of three consecutive days without supply of renewable energies, e.g. three days without sun, wind, etc.

Furthermore, renewable energy generators can be used in combination with diesel generators or the grid in a hybrid mode, reducing the diesel consumption or the renewable infrastructure requirements. There are already several techniques available to minimize diesel consumption or optimize efficiency by means of a smart combination of working cycles and proper performance regimes.

The dimensioning criteria previously discussed are a usual practice across the industry, but they can be modified to ensure a higher service commitment or to relax the level of passive infrastructure needs. However, in the first case for most of the time the energy available for supply to the base station will be much higher than the energy consumption thereof, which is inefficient. In the second case, on the contrary, there will be a relatively long time without any service provided by the base station, because of lack of supplied energy.

SUMMARY OF THE INVENTION

It is an object of the invention to provide a method for use in a cellular communication network and a corresponding system resulting in an improved perceived service level by the mobile users for a given dimension of the renewable energy generator and back-up battery supply of the base station.

Thereto, according to the invention a method and a system according to the independent claims are provided. Favourable embodiments are defined in the dependent claims.

According to an aspect of the invention, a method is provided for adapting a service provided by a base station in a cellular communication network to mobile stations in its coverage area, the base station being supplied with energy from a renewable energy generator and/or from a back-up battery supply and the back-up battery supply at least partially being charged by the renewable energy generator. The service is adapted in terms of coverage and/or capacity (wherein the capacity is the number of channels and/or the bandwidth) provided by the base station to the mobile stations as a function of the stored energy in the back-up battery supply and/or as a function of a forecast regarding the amount of energy supplied by the renewable energy generator over a time period.

According to a further aspect of the invention, a system is provided for adapting a service provided by a base station in a cellular communication network to mobile stations in its coverage area, the base station being supplied with energy from a renewable energy generator and/or from a back-up battery supply and the back-up battery supply at least partially being charged by the renewable energy generator. The system is configured for adapting the service in terms of coverage and/or capacity provided by the base station to the mobile stations as a function of the stored energy in the back-up battery supply and/or as a function of a forecast regarding the amount of energy supplied by the renewable energy generator over a time period.

The present invention is based on the recognition that, in case of having only a limited back-up battery load and/or in case of a prolonged outage of the renewable energy supply, it is feasible to extend the battery discharging time through a controlled degradation of the coverage and/or capacity provided by the base station. This indeed may negatively impact on the perceived service by some of the mobile users, but not as dramatically as in the case that there would be a complete outage of the base station, which would be the case if the back-up batteries were completely discharged before the time of recovery of the renewable energy resource.

Similarly, the recharging time of the back-up batteries can be shortened by adapting the service in terms of coverage and/or capacity, by devoting more of the energy supplied by the renewable energy generator to reload the back-up batteries and less to the radio power consumption of the base station.

As a result, compared to the prior art method and system described herein above, the invention either may result in an improved service perception by the mobile users or the back-up battery size and/or renewable generator size may be reduced without degradation of the service perception by the mobile users.

According to an embodiment of the present invention, the coverage and/or capacity is reduced compared to the coverage and/or capacity corresponding to a standard service level when the stored energy in the back-up battery supply falls below a threshold level.

Preferably, the forecast regarding the amount of energy supplied by the renewable energy generator is based on a weather forecast for the time period. The time period should not exceed the maximum time for which the level of confidence weather forecast is high enough. This level of confidence decreases for longer forecasts, but considering the usual periods taken by the industry for back-up battery discharge (three days) and recharge (ten days), weather forecasts are a powerful tool to control the overall service.

According to a further embodiment, the coverage and/or capacity is furthermore adapted based on an expected energy consumption of the base station over the time period. As a result, a still further improved control of the provided service level is obtained.

According to a still further embodiment of the invention, there is a plurality of defined typical energy consumption patterns each corresponding to a coverage and/or a capacity provided by the base station, which are prioritised according to minimized impact on user experience. The typical energy consumption pattern with the highest priority is determined for which the stored energy in the back-up battery supply plus the amount of energy expected to be charged to the back-up battery supply over the time period assuming no energy consumption of the base station minus the expected energy consumption of the base station over the time period according to the typical energy consumption pattern is higher than a threshold value. The coverage and/or capacity is adapted according to the determined typical energy consumption pattern. In this way, an efficient and reliable technique for service control is provided, resulting in a small likelihood of complete outage and an optimal perceived service level by the mobile users.

Preferably, it is determined in an Operations and Maintenance Centre of the cellular communication network how the coverage and/or capacity of the base station should be adapted. The Operations and Maintenance Centre transmits signalling messages to the base station comprising instructions thereto and the base station adapts the coverage and/or capacity, accordingly.

The Operations and Maintenance Centre is the responsible network node for automatically adapting other operating parameters of the base station, so it is the most suitable network node for determining the coverage and/or capacity to be provided by the base station. However, the determination thereof may also be performed by other network nodes, including the base station itself.

Preferably, the method according to the invention is implemented by means of a computer program loaded to one or more of the network nodes of the cellular communication network.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawing, in conjunction with the accompanying specification, in which.

Throughout the figures like reference numerals refer to like elements.

DETAILED DESCRIPTION OF THE PRESENT INVENTION

Figure 1:
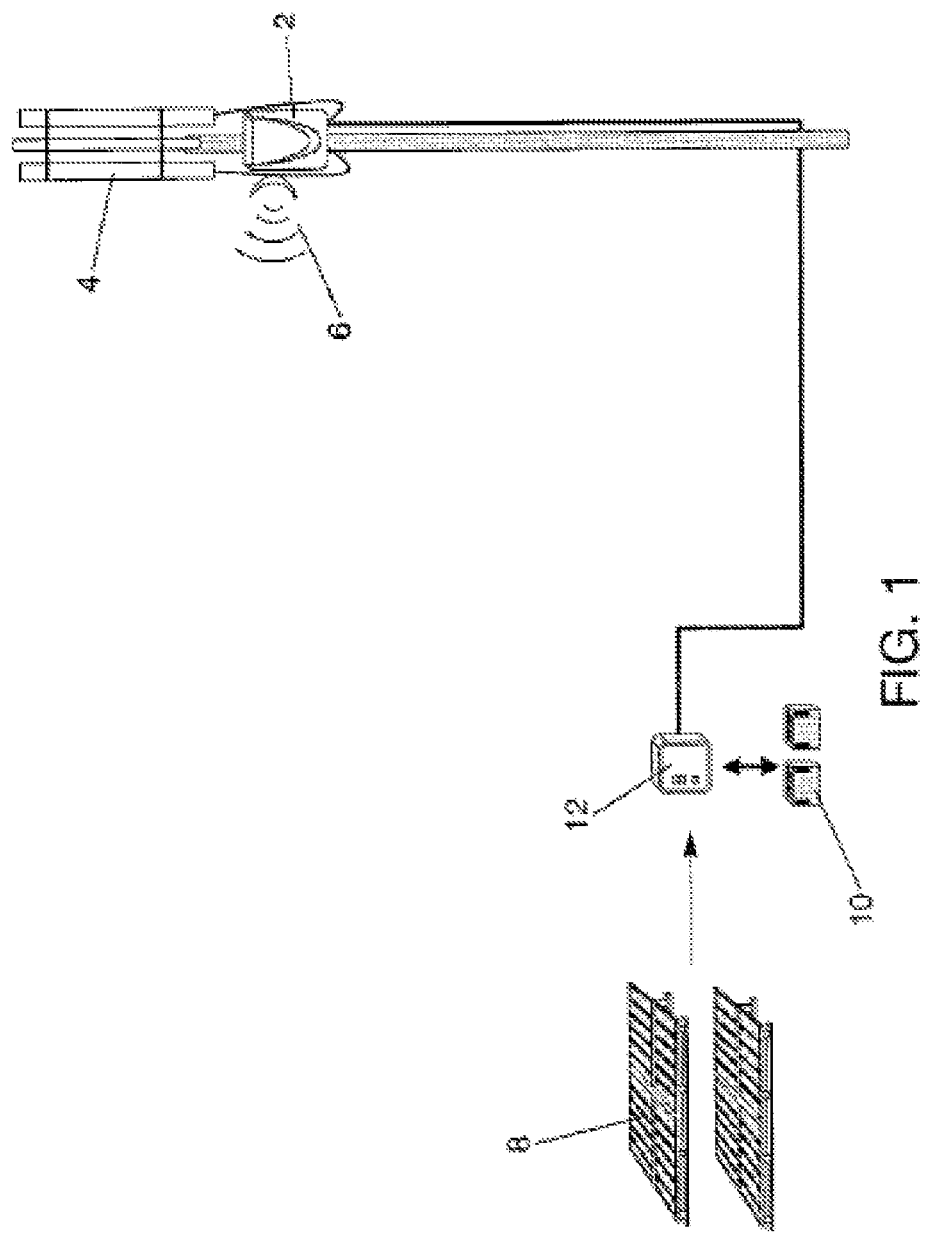
FIG. 1 shows a diagram of the relevant elements of a base station supplied with renewable energy, wherein the present invention may be implemented.

FIG. 1 shows a diagram of the relevant elements of a base station 2 supplied with renewable energy, wherein the present invention may be implemented. The base station is referred to as Base Transceiver Station (BTS) in case of a GSM cellular communication network or Node B in case of a UMTS cellular communication network. The base station 2 comprises mobile service coverage antennas 4 and a transmission system and antenna 6 for communicating to the hierarchically next higher network node in the network architecture, in case of a GSM network a Base station Controller (BSC) and in case of a UMTS network a Radio Network Controller (RNC). The base station is supplied with power from a renewable energy generator 8, in this case consisting of solar panels. However, the renewable energy generator may also be a wind turbine, bio-cells, etc. In case that the renewable energy generator does not generate enough power to fulfil the energy demand of the base station, the base station is supplied with power from a back-up battery supply 10 either in addition to or instead of the power supplied by the renewable generator 8. In case that the renewable energy generator generates more power than needed by the base station, the excess energy is stored in the back-up batter supply 10. The power supply controller 12 controls which energy source is used for the power supply to the base station and if the back-up battery is recharged with energy generated by the renewable energy generator or not.

The energy consumption of a base station can be roughly divided into the following components:

The first component is the energy required to feed the signal processing components according to the particular technology used. This includes modulation, codification, signal processing, transmission interface adaptation, operation and maintenance commands, etc. The first component can be considered as constant.

The second component is the energy required to power the transmission link to the hierarchically next higher network node (BSC/RNC). The second component can also be considered as constant.

The third component is the energy required to provide cell coverage to mobile stations by means of pilot channels. This is the energy necessary to permanently transmit cell information and signalling that has to be broadcasted to all users, over the Common Pilot Channel (CPICH) in the case of third generation networks, Broadcast Control Channel (BCCH) in the case of second generation networks, etc. The power strength of this channel is usually dimensioned to balance the uplink—downlink budget: the power strength of this channel determines the cell edge, i.e. the farthest point at which a mobile station still correctly receives (decodes) the BCCH/CPICH of the base station. However, also the uplink signals transmitted by mobile stations (at maximum power) located at this cell edge should be correctly received by the base station. For this reason, the strength of the BCCH/CPICH should be so adapted that this is the case. However, in some cases (indoor cells, microcells, etc.) the output power for this channel is limited to make equipment smaller and/or reduce power needs.

The fourth component is the energy dissipated by overheads, such as air conditioning at base station sites. This is required to maintain base station equipment at proper temperature set points. In some occasions this component contributes 25% to the overall energy needs of the base station. The fifth and last component is the power consumption to cope with traffic channels and user specific signalling channels. It presents a significant periodic nature and is also very dependant on conditions on the radio channel of a particular connection, such as the signal-to-noise ratio, radio distance of the user to the base station, etc. This component is also extremely sensitive to the type of used bearer: an Adaptive MultiRate (AMR) 12.2 kbps voice channel consumes much less energy than a High Speed Packet Access (HSPA) 7.2 Mbps File Transfer Protocol (FTP) connection.

The invention is based on the recognition that smart control of the third and fifth component results in a significant reduction of the power consumption of the base station at only a relatively moderate reduction of the service level in terms of the provided coverage and capacity (number of channels and/or bandwidth) provided to the mobile stations.

The benefits of this approach are best illustrated by a numerical example. A BTS with very low requirements in terms of power consumption may consume as little as 200 watts in total for 30 watts of maximum output power. In order to comply with the strictest criteria of storing enough back-up energy for enabling normal operation of the base station for three days during an outage of the renewable energy source and ten days to fully recharge the battery without outage of the renewable energy source, this base station requires four sets of back-up batteries and twelve solar panels.

In case of low traffic in the cell covered by the base station, a reduction of 4 dBs in the Broadcast Control Channel (BCCH) power reduces the total energy consumption of the base station 50%, allowing the use of only half the amount of back-up batteries and solar panels. If this 4 dBs of BCCH signal reduction only takes place when needed, i.e. in case of only a limited amount of energy stored in the back-up batteries and when solar radiation is not expected at all over some time, the percentage of the time of this service (coverage) degradation is very low. However, it has the advantage of reducing the energy infrastructure costs and needs by 50%.

Figure 2:
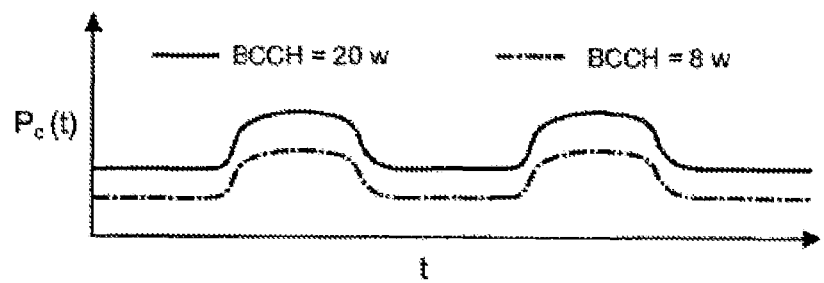
FIG. 2 shows a base station power consumption function for different transmission powers of the broadcast control channel.

An alternative way of using the smart control by the present invention is to even further increase the service reliability of the base station. Take the example given herein above, with four sets of back-up batteries, i.e. the back-up batteries being dimensioned for three days of renewable energy source outage: in a situation with the back-up batteries at 100% load, and a weather forecast of five consecutive cloudy days until the next sunny day, it is possible to keep the BTS running without outage by reducing its coverage by only 4 dBs, i.e. decreasing the transmission power of the BCCH from 20 to 8 Watts. The typical BTS power consumption as a function of time over a period of two and a half days for transmission powers of the BCCH of 20 and 8 Watts, respectively is shown in FIG. 2.

Figure 3:
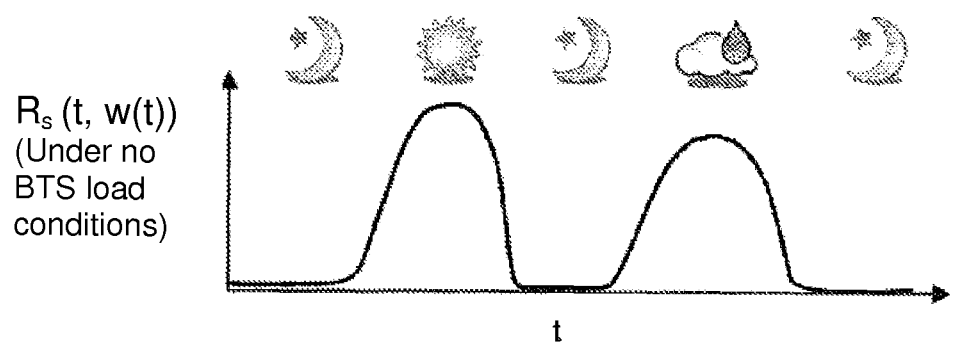
FIG. 3 shows a typical back-up battery charging function.

FIG. 3 shows a typical example of the speed of recharging of the back-up batteries as a function of time over a period of two and a half days in case of using solar panels and assuming no energy consumption of the base station. The battery is not charged during night time due to the absence of sun and it is charged much faster on sunny days than on cloudy/rainy days.

Figure 4:
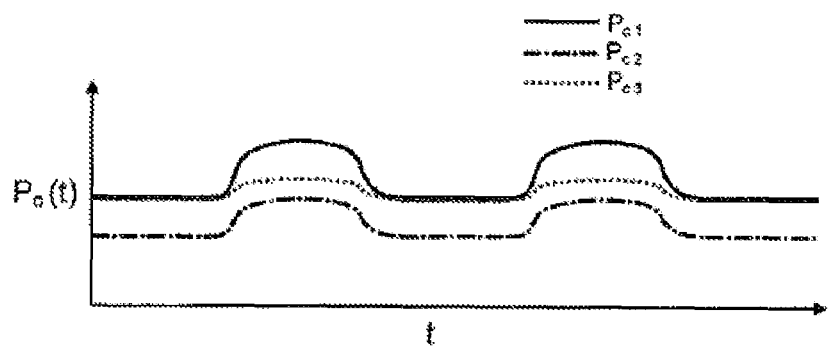
FIG. 4 shows general patterns of a base station power consumption function.

Generally, the base station power consumption may be reduced following different criteria in terms of service reduction. It may be a coverage reduction only by reducing the transmission power of the BCCH/CPICH, a capacity reduction only by reducing the number of channels provided to the mobile stations in the cell area and/or by reducing the provided bandwidth or it may be a combination coverage reduction and capacity reduction. It is easily possible to establish a model of the typical power consumption of a base station, $P_c$ (t), as a function of time and different patterns of this power consumption function, $P_{ci}$; (t), depending on the level and type of service reduction. FIG. 4 shows typical power consumption functions over two and a half days in case of no service reduction (i.e. full coverage and capacity)—$P_{c1}$, limited coverage—$P_{c2}$ and limited capacity—$P_{c3}$. The typical power consumption in case of limited coverage $P_{c2}$ is lower than the typical power consumption in case of no service reduction $P_{c1}$ both during day and night. The typical power consumption in case of limited capacity $P_{c3}$ is lower than the typical power consumption in case of no service reduction $P_{c1}$ during the day, during the night there is no difference.

A simple algorithm that may be used to select a more sparing radio consumption pattern is as follows: once the remaining battery load Q in the back-up batteries drops under Y % (a hysteresis may be added on top of Y %), the total radio transmission output power is reduced by X dBs.

So,

If Q>Y % then:
The standard coverage and/or capacity is provided by the base station If Q<Y % then:
A coverage and/or capacity is provided corresponding to a reduction of X dBs in total radio transmission output power.

However, a more sophisticated and efficient technique is to determine the typical base station power consumption pattern that best suits the weather forecast and the back-up batteries charging model:

From T=0 to T=$T_{max\_weather\_forecast}$ $$Q + \int_0^T R_S(t, w(t))\, dt - \int_0^T P_{ci}(t)\, dt > Q_{threshold}$$

wherein:

Q is the remaining load in the back-up batteries.

$P_{ci}$ corresponds to a list of N possible typical patterns of power consumption at the base station, prioritised according to minimized impact on user experience: $\{P_{c1}(t); \ldots; P_{cN}(t)\}$. Each $P_{ci}(t)$ will be the result of reducing service parameters at the base station, i.e. coverage and/or capacity.

$R_S(t, w(t))$ is the back-up batteries charging speed function. The dependency on the amount of power supplied by the renewable energy systems is presented in terms of time and weather forecast $w(t)$.

$T = T_{max\_weather\_forecast}$: the maximum period of time for which the reliability of the weather forecast is high enough.

$Q_{threshold}$ is the minimum amount of energy that at $T_{max\_weather\_forecast}$ should be expected to be stored in the back-up batteries. It may be zero but for safety reasons a higher value may be chosen.

As a result of this algorithm the coverage and capacity are provided corresponding to the first power consumption pattern, $P_{ci}(t)$, of the prioritized list $\{P_{c1}(t); \ldots; P_{cN}(t)\}$, that fulfils the previous equation.

The algorithms described herein above may be implemented by means of a computer program loaded to a processor in the Operations and Maintenance Centre of the cellular communication network. The Operations and Maintenance Centre transmits signalling messages known per se to the base station comprising instructions how to adapt the service in terms of coverage and/or capacity. The base station adapts the coverage and/or capacity, accordingly. In case of adapting the coverage, the transmission power of the BCCH/CPICH should be adapted by controlling the signal amplifier of this channel, accordingly. In case of adapting the capacity, the power amplifiers corresponding to the channels to be suppressed are switched off.

While the invention has been illustrated and described in detail in the drawings and foregoing description, such illustration and description are to be considered illustrative or exemplary and not restrictive; the invention is not limited to the disclosed embodiments.

For example, the present invention may be implemented in the Evolved Nodes-B (eNB) of a Long Term Evolution (LTE) cellular communication network, currently being standardised and also often referred to as the fourth generation (4G) cellular network.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Method for adapting a service provided by a base station in a cellular communication network to mobile stations in a coverage area of the base station, the method comprising:
   supplying the base station with energy from a renewable energy generator and/or from a back-up battery supply that is at least partially being charged by the renewable energy generator, and
   adapting the service in terms of coverage and/or a number of channels provided to the mobile stations as a function of an amount of stored energy in the back-up battery supply and/or as a function of a forecast regarding an amount of energy supplied by the renewable energy generator over a time period,
   wherein a capacity of the base station is defined as the number of channels and/or a bandwidth provided to the mobile stations,
   wherein there are a plurality of defined typical energy consumption patterns each corresponding to a coverage level and/or a capacity level provided by the base station,
   wherein the coverage and/or the capacity is adapted according to a determined defined typical energy consumption pattern among the plurality of defined typical energy consumption patterns,
   wherein the plurality of defined typical energy consumption patterns are prioritised according to minimized impact on user experience and include a first defined typical energy consumption pattern having a highest priority among the plurality of defined typical energy consumption patterns, and
   wherein the first defined typical energy consumption pattern is determined as the determined defined typical energy consumption pattern for situations in which the amount of stored energy in the back-up battery supply plus an amount of energy expected to be charged to the back-up battery supply over the time period assuming no energy consumption of the base station minus the expected energy consumption of the base station over the time period according to the typical energy consumption pattern is higher than a threshold value.

2. Method according to claim 1, wherein the coverage and/or the capacity is reduced compared to a coverage level and/or a capacity level corresponding to a standard service level when the amount of stored energy in the back-up battery supply falls below a threshold level.

3. Method according to claim 1, wherein the forecast regarding the amount of energy supplied by the renewable energy generator is based on a weather forecast for the time period.

4. Method according to claim 1, wherein it is determined in an Operations and Maintenance Centre of the cellular communication network how the coverage and/or the capacity of the base station should be adapted, the Operations and Maintenance Centre transmits signalling messages to the base station comprising instructions thereto, and the base station adapts the coverage and/or the capacity, accordingly.

5. System for adapting a service provided by a base station in a cellular communication network to mobile stations in a coverage area of the base station, the base station being supplied with energy from a renewable energy generator and/or from a back-up battery supply that is at least partially being charged by the renewable energy generator, wherein the system is configured for adapting the service in terms of coverage and/or a number of channels provided to the mobile stations as a function of an amount of stored energy in the back-up battery supply and/or as a function of a forecast regarding an amount of energy supplied by the renewable energy generator over a time period,
  wherein a capacity of the base station is defined as the number of channels and/or a bandwidth provided to the mobile stations,
  wherein there are a plurality of defined typical energy consumption patterns each corresponding to a coverage level and/or a capacity level provided by the base station,
  wherein the system is configured to adapt coverage and/or the capacity according to a determined defined typical energy consumption pattern among the plurality of defined typical energy consumption patterns,
  wherein the plurality of defined typical energy consumption patterns are prioritised according to minimized impact on user experience and include a first defined typical energy consumption pattern having a highest priority among the plurality of defined typical energy consumption patterns, and
  wherein the system is configured to determine the first defined typical energy consumption pattern as the determined defined typical energy consumption pattern for situations in which the amount of stored energy in the back-up battery supply plus an amount of energy expected to be charged to the back-up battery supply over the time period assuming no energy consumption of the base station minus the expected energy consumption of the base station over the time period according to the typical energy consumption pattern is higher than a threshold value.

6. System according to claim 5, wherein the system is configured to reduce the coverage and/or the capacity compared to a coverage level and/or a capacity level corresponding to a standard service level when the amount of stored energy in the back-up battery supply falls below a threshold level.

7. System according to claim 5, wherein the forecast regarding the amount of energy supplied by the renewable energy generator is based on a weather forecast for the time period.

8. System according to claim 5, wherein an Operations and Maintenance Centre of the cellular communication network is configured to determine how the coverage and/or the capacity of the base station should be adapted and to transmit signalling messages to the base station comprising instructions thereto, and wherein the base station is configured to adapt the coverage and/or the capacity, accordingly.

* * * * *